United States Patent [19]
Wevers et al.
[11] Patent Number: 4,559,169
[45] Date of Patent: Dec. 17, 1985

[54] STABLE LIQUID DETERGENTS CONTAINING ANIONIC SURFACTANT AND MONOSULFONATED BRIGHTENER

[75] Inventors: Jean Wevers, Grimbergen, Belgium; Linda A. Halas, Cincinnati, Ohio; Philippe R. Peltre, Neuilly sur Seine, France

[73] Assignee: The Procter & Gamble Company, Cincinnati, Ohio

[21] Appl. No.: 642,023

[22] Filed: Aug. 17, 1984

[51] Int. Cl.[4] ........................ C09K 11/02; C09K 11/06

[52] U.S. Cl. .................................... 252/543; 252/117; 252/174.13; 252/174.21; 252/174.23; 252/301.35; 252/524; 252/91; 252/121

[58] Field of Search ................. 252/543, 545, DIG. 4, 252/DIG. 14, 117, 301.23, 301.35

[56] References Cited

U.S. PATENT DOCUMENTS

| | | | |
|---|---|---|---|
| 627,600 | 7/1984 | Halas . | |
| 2,762,802 | 9/1956 | Hausermann et al. | 260/249.6 |
| 2,784,183 | 3/1957 | Keller et al. | 260/240 |
| 3,812,041 | 5/1974 | Inamorato | 252/89 |
| 3,959,157 | 5/1976 | Inamorato | 252/8.8 |
| 4,309,316 | 1/1982 | Lange et al. | 252/543 |
| 4,430,236 | 2/1974 | Franks | 252/95 |

FOREIGN PATENT DOCUMENTS

| | | |
|---|---|---|
| 2543998 | 4/1977 | Fed. Rep. of Germany . |
| 49-017004 | 4/1974 | Japan . |
| 2028365 | 5/1980 | United Kingdom . |

OTHER PUBLICATIONS

A Guide to Tinapol Fluorescent Whitening Agents for the Soap and Detergent Industry, Ciba-Geigy Technical Bulletin, 1981.

*Primary Examiner*—Paul Lieberman
*Assistant Examiner*—John F. McNally
*Attorney, Agent, or Firm*—Donald E. Hasse; Robert B. Aylor; Thomas H. O'Flaherty

[57] ABSTRACT

Stable isotropic liquid laundry detergents containing anionic surfactant and sodium 4,4'-bis((4-anilino-6-morpholino-1,3,5-triazin-2-yl)-amino)-2-stilbenesulfonate to reduce brightener staining of fabrics while maintaining fabric whiteness.

11 Claims, No Drawings

STABLE LIQUID DETERGENTS CONTAINING ANIONIC SURFACTANT AND MONOSULFONATED BRIGHTENER

TECHNICAL FIELD

The present invention relates to stable, preferably single-phase, isotropic liquid laundry detergents containing anionic synthetic surfactant and a monosulfonated brightener which reduces or eliminates brightener staining of fabrics while maintaining an acceptable level of whitening. Particularly preferred are monosulfonated naphthotriazolyl stilbene (NTS) brighteners. Preferred compositions also contain a minor amount of a second brightener to further improve fabric whitening. In such compositions, the monosulfonated brightener herein should represent at least about 60%, preferably at least about 75%, by weight of the total brightener in order to provide the desired reduction in fabric staining.

Optical brighteners, also known as fluorescent whitening agents, are commonly used in laundry detergents. Brighteners deposit onto fabrics where they absorb ultraviolet radiant energy and reemit it as a blue light. This reduces or eliminates any yellowish cast to fabrics and gives them a brighter appearance. However, undesirable brightener staining can occur when liquid detergents come in direct contact with cotton-containing fabrics, such as during pretreatment. The present invention reduces or eliminates such staining while maintaining an acceptable level of fabric whitening.

BACKGROUND ART

British Pat. No. 2,028,365, Gray, published Mar. 5, 1980, discloses built liquid detergents containing anionic surfactants and one or more brighteners, including NTS brighteners.

U.S. Pat. No. 3,812,041, Inamorato, issued May 21, 1974, discloses unbuilt liquid detergents containing nonionic surfactants and anionic surfactants in a weight ratio of nonionic to anionic of at least 1. Optional brighteners can include the NTS type.

U.S. Pat. No. 3,959,157, Inamorato, issued May 25, 1976, discloses liquid detergents containing nonionic surfactants, quaternary ammonium softening agents and optional brighteners, including NTS brighteners.

U.S. Pat. No. 4,430,236, Franks, issued Feb. 7, 1984, discloses liquid detergents containing nonionic surfactants, optional anionic surfactants, hydrogen peroxide, brightener, and preferably quaternary ammonium softening compounds. NTS brighteners are specifically mentioned as being useful.

Japanese Patent Application No. J74-017004, published Apr. 26, 1974, discloses liquid detergents containing NTS brighteners said to be stable to light.

German Patent Application No. 2,543,998, published Apr. 7, 1977, discloses clear liquid detergents containing certain diphenyl distyryl brighteners. Examples 1 and 2 are of liquid detergents containing mixtures of monosulfonated and disulfonated brighteners.

SUMMARY OF THE INVENTION

The present invention relates to stable isotropic liquid laundry detergent compositions comprising, by weight:

(a) from about 3% to about 50% of an anionic synthetic surfactant; and (b) from about 0.01% to about 1% of the monosulfonated brightener 4,4'-bis((4-anilino-6-morpholino-1,3,5-triazin-2-yl)amino)-2-stilbenesulfonic acid, or a water-soluble salt thereof, which represents at least about 60% of the total brightener in the composition; said composition containing less than about 2% of quaternary ammonium cationic surfactants having 2 chains, each containing an average of from about 16 to about 22 carbon atoms.

DETAILED DESCRIPTION OF THE INVENTION

The compositions of the present invention comprise from about 3% to about 50%, preferably from about 7% to about 40%, and most preferably from about 15% to about 25%, by weight of an anionic synthetic surfactant. Suitable anionic surfactants are disclosed in U.S. Pat. No. 4,285,841, Barrat et al, issued Aug. 25, 1981, and in U.S. Pat. No. 3,929,678, Laughlin et al, issued Dec. 30, 1975, both incorporated herein by reference.

Useful anionic surfactants include the water-soluble salts, particularly the alkali metal, ammonium and alkylolammonium (e.g., monoethanolammonium or triethanolammonium) salts, of organic sulfuric reaction products having in their molecular structure an alkyl group containing from about 10 to about 20 carbon atoms and a sulfonic acid or sulfuric acid ester group. (Included in the term "alkyl" is the alkyl portion of aryl groups.) Examples of this group of synthetic surfactants are the alkyl sulfates, especially those obtained by sulfating the higher alcohols ($C_8$–$C_{18}$ carbon atoms) such as those produced by reducing the glycerides of tallow or coconut oil; and the alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 14.

Other anionic surfactants herein are the water-soluble salts of: paraffin sulfonates containing from about 8 to about 24 (preferably about 12 to 18) carbon atoms; alkyl glyceryl ether sulfonates, especially those ethers of $C_{8-18}$ alcohols (e.g., those derived from tallow and coconut oil); alkyl phenol ethylene oxide ether sulfates containing from about 1 to about 4 units of ethylene oxide per molecule and from about 8 to about 12 carbon atoms in the alkyl group; and alkyl ethylene oxide ether sulfates containing about 1 to about 4 units of ethylene oxide per molecule and from about 10 to about 20 carbon atoms in the alkyl group.

Other useful anionic surfactants herein include the water-soluble salts of esters of alpha-sulfonated fatty acids containing from about 6 to 20 carbon atoms in the fatty acid group and from about 1 to 10 carbon atoms in the ester group; water-soluble salts of 2-acyloxyalkane-1-sulfonic acids containing from about 2 to 9 carbon atoms in the acyl group and from about 9 to about 23 carbon atoms in the alkane moiety; water-soluble salts of olefin sulfonates containing from about 12 to 24 carbon atoms; and beta-alkyloxy alkane sulfonates containing from about 1 to 3 carbon atoms in the alkyl group and from about 8 to 20 carbon atoms in the alkane moiety.

Preferred anionic surfactants are the $C_{10}$–$C_{18}$ alkyl sulfates containing an average of from 0 to about 4 ethylene oxide units per mole of alkyl sulfate, $C_{11}$–$C_{13}$ linear alkylbenzene sulfonates, and mixtures thereof.

The compositions herein can also contain other synthetic surfactants known in the art, such as the nonionic, cationic, zwitterionic, and ampholytic surfactants described in the above-cited Barrat et al and Laughlin et al patents. Preferably, the total synthetic surfactant represents from about 15% to about 60%, preferably from about 20% to about 40%, by weight of the composition. In addition, the anionic synthetic surfactant preferably represents at least about 25%, more preferably at least about 30%, and most preferably at least about 50%, by weight of the synthetic surfactant in the composition. It is believed that such anionic surfactant-containing systems provide a sufficiently high level of cleaning and antiredeposition performance that good fabric whitening can be maintained when using the monosulfonated brighteners herein instead of more effective (but higher staining) brighteners.

A preferred cosurfactant, used at a level of from about 2% to about 30%, preferably from about 3% to about 25%, more preferably from about 4% to about 15%, by weight of the composition, is an ethoxylated nonionic surfactant of the formula $$R^1(OC_2H_4)_nOH,$$

wherein $R^1$ is a $C_{10}$–$C_{16}$ alkyl group or a $C_8$–$C_{12}$ alkyl phenyl group, n is from about 3 to about 9, and said nonionic surfactant has an HLB (hydrophile-lipophile balance) of from about 10 to about 13. These surfactants are more fully described in U.S. Pat. Nos. 4,285,841, Barrat et al, issued Aug. 25, 1981, and 4,284,532, Leikhim et al, issued Aug. 18, 1981, both incorporated herein by reference. Particularly preferred are condensation products of $C_{12}$–$C_{15}$ alcohols with from about 3 to about 8 moles of ethylene oxide per mole of alcohol, e.g., $C_{12}$–$C_{13}$ alcohol condensed with about 6.5 moles of ethylene oxide per mole of alcohol. While these nonionic surfactants are preferably included in the present compositions to enhance cleaning, it is believed they also tend to solubilize the NTS brighteners and prevent them from depositing on fabrics. This can lead to poorer whiteness maintenance in compositions in which the nonionic surfactant comprises a major amount of the synthetic surfactant.

Other preferred cosurfactants, used at a level of from about 0.5% to about 3%, preferably from about 0.7% to about 2%, by weight, are certain quaternary ammonium, amine or amine oxide surfactants. The quaternary ammonium surfactants useful herein are of the formula:

$$[R^2(OR^3)_y][R^4(OR^3)_y]_2R^5N^+X^-$$

wherein $R^2$ is an alkyl or alkyl benzyl group having from about 6 to about 16 carbon atoms in the alkyl chain; each $R^3$ is selected from the group consisting of $-CH_2CH_2-$, $-CH_2CH(CH_3)-$, $-CH_2CH(CH_2OH)-$, $-CH_2CH_2CH_2-$, and mixtures thereof; each $R^4$ is selected from the group consisting of $C_1$–$C_4$ alkyl, $C_1$–$C_4$ hydroxyalkyl, benzyl, and hydrogen when y is not 0; $R^5$ is the same as $R^4$ or is an alkyl chain wherein the total number of carbon atoms of $R^2$ plus $R^5$ is from about 8 to about 16; each y is from 0 to about 10 and the sum of the y values is from 0 to about 15; and X is any compatible anion.

Preferred of the above are the alkyl quaternary ammonium surfactants, especially the mono-long chain alkyl surfactants described in the above formula when $R^5$ is selected from the same groups as $R^4$. The most preferred quaternary ammonium surfactants are the chloride, bromide and methylsulfate $C_{8-16}$ alkyl trimethylammonium salts, $C_{8-16}$ alkyl di(hydroxyethyl)methylammonium salts, the $C_{8-16}$ alkyl hydroxyethyldimethylammonium salts, $C_{8-16}$ alkyloxypropyl trimethylammonium salts, and the $C_{8-16}$ alkyloxypropyl dihydroxyethylmethylammonium salts. Of the above, the $C_{10}$–$C_{14}$ alkyl trimethylammonium salts are preferred, e.g., decyl trimethylammonium methylsulfate, lauryl trimethylammonium chloride, myristyl trimethylammonium bromide and coconut trimethylammonium chloride and methylsulfate.

Under cold water washing conditions, i.e., less than about 65° F. (18.3° C.), the $C_{8-10}$ alkyl trimethylammonium surfactants are particularly preferred since they have lower Kraft boundaries and crystallization temperatures than the longer chain quaternary ammonium surfactants.

Amine surfactants useful herein are of the formula:

$$[R^2(OR^3)_y][R^4(OR^3)_y]R^5N$$

wherein the $R^2$, $R^3$, $R^4$, $R^5$ and y substituents are as defined above for the quaternary ammonium surfactants. Particularly preferred are the $C_{12-16}$ alkyl dimethyl amines.

Amine oxide surfactants useful herein are of the formula:

$$[R^2(OR^3)_y][R^4(OR^3)_y]R^5N\rightarrow O$$

wherein the $R^2$, $R^3$, $R^4$, $R^5$ and y substituents are also as defined above for the quaternary ammonium surfactants. Particularly preferred are the $C_{12-16}$ alkyl dimethyl amine oxides.

Amine and amine oxide surfactants are preferably used at higher levels than the quaternary ammonium surfactants since they typically are only partially protonated in the present compositions. For example, preferred compositions herein can contain from about 0.5% to about 1.5% of the quaternary ammonium surfactant, or from about 1% to about 3% of the amine or amine oxide surfactants.

The compositions herein can also contain minor amounts, generally less than about 2%, preferably less than 1%, by weight of quaternary ammonium cationic surfactants having 2 chains, each containing an average of from about 16 to about 22 carbon atoms. These surfactants are disclosed in British Pat. No. 2,041,968, Murphy, published Sept. 19, 1979, incorporated herein by reference. However, the compositions are preferably substantially free of such surfactants because they can cause an undesirable "quat" staining of fabrics, thereby reducing or eliminating the benefits obtained from using the low staining monosulfonated brighteners herein. The di-long chain cationic surfactants also tend to complex with the anionic brighteners and surfactants herein, reducing the effectiveness of both materials.

MONOSULFONATED BRIGHTENER

The compositions of the present invention contain from about 0.01% to about 1%, preferably from about 0.05% to about 0.5%, more preferably from about 0.1% to about 0.3%, by weight of a monosulfonated brightener. While not intending to be limited by theory, it is believed that the monosulfonated brighteners herein cause less staining of fabrics because their lack of symmetry and/or decreased solubility reduces crystal growth and build up of brightener on fabrics. For example, the preferred NTS brighteners herein have substantial substitution (i.e., naphthotriazoyl and sulfonate groups) on one side of a stilbene group and no substitution on the other side.

Preferred monosulfonated brighteners are of the formulas (1)

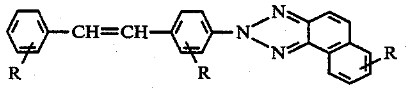

(2)

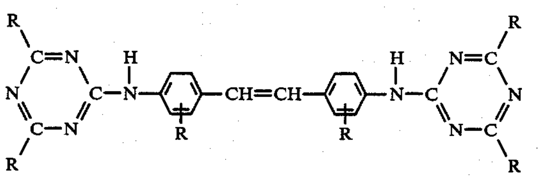

(3)

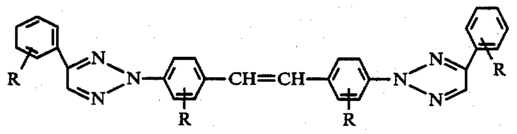

(4)

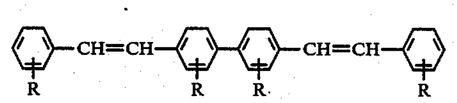

wherein one R per molecule is $SO_3M$; M is a compatible cation, such as hydrogen, sodium (preferred), potassium, ammonium, or substituted ammonium (e.g., mono-, di-, or tri-ethanolammonium); and each other R is selected from the group consisting of hydrogen, hydroxy, alkyl, hydroxyalkyl, oxyalkyl, amino, substituted amino where each substituent is hydroxy, alkyl, hydroxyalkyl, or oxyalkyl, morpholino, anilino, halogen and cyano, said alkyl groups containing from 1 to 4 carbon atoms.

Preferred brighteners are those of the above formulas where the $SO_3M$ group is attached directly to the stilbene portion of the molecule. Preferably, each other R is selected from the group consisting of hydrogen, hydroxy, alkyl, hydroxyalkyl, amino, substituted amino where each substituent is hydroxy, alkyl or hydroxyalkyl, morpholino and anilino, said alkyl groups containing from 1 to 3 carbon atoms. In a particularly preferred brightener of formula (1), each other R is hydrogen, i.e., sodium 4-(2H-naphtho[1,2-d]triazol-2-yl)-2-stilbenesulfonate, which is commercially available as Tinopal RBS from Ciba-Geigy. Preferred brighteners of formula (2) are those wherein the other R attached to the stilbene portion of the molecule is hydrogen, one R attached to the triazine rings is anilino and the other R is diethanolamino, morpholino, methylhydroxyethylamino, 2-hydroxypropyl amino, or anilino. Particularly preferred is 4,4'-bis((4-anilino-6-morpholino-1,3,5-triazin-2-yl)amino)-2-stilbene-sulfonic acid, and the water-soluble salts thereof. Preferred brighteners of formula (3) and (4) are those wherein the other R's are all hydrogen.

Preferred compositions herein also contain a minor amount of a second brightener to improve fabric whitening. In such compositions, the monosulfonated brightener herein represents from about 60% to about 99%, preferably from about 75% to about 95%, more preferably from about 80% to about 95%, most preferably from about 85% to about 90%, by weight of the total brightener in order to improve whitening while reducing staining to an acceptable degree. Suitable cobrighteners include any of those known for use in detergent compositions. Examples are disclosed in U.S. Pat. No. 3,812,041, Inamorato, issued May 21, 1974, particularly from column 6, line 45 to column 8, line 42, incorporated herein by reference.

OTHER COMPONENTS

The compositions of the present invention preferably contain from about 25% to about 65%, more preferably from about 30% to about 60%, most preferably from about 40% to about 55%, by weight of water.

The compositions also preferably contain from about 3% to about 30%, more preferably from about 5% to about 20%, by weight of a fatty acid containing from about 10 to about 22 carbon atoms. The fatty acid can also contain from about 1 to about 10 ethylene oxide units in the hydrocarbon chain. Preferred are saturated fatty acids containing from about 10 to about 14 carbon atoms. In addition, the weight ratio of $C_{10}$–$C_{12}$ fatty acid to $C_{14}$ fatty acid should be at least 1, preferably at least 1.5.

Suitable saturated fatty acids can be obtained from natural sources such as plant or animal esters (e.g., stripped palm kernel oil, stripped palm oil and coconut oil) or synthetically prepared (e.g., via the oxidation of petroleum or by hydrogenation of carbon monoxide via the Fischer-Tropsch process). Examples of suitable saturated fatty acids for use in the compositions of this invention include capric, lauric, myristic, coconut and palm kernel fatty acid. Preferred are saturated coconut fatty acids, from about 5:1 to 1:1 (preferably about 3:1) weight ratio mixtures of lauric and myristic acid, mixtures of the above with minor amounts (e.g., 10%–30% of total fatty acid) of oleic acid; and stripped palm kernel fatty acid.

The compositions herein also preferably contain up to about 25%, preferably from about 1% to about 10%, by weight of a detergent builder material. Detergent builders are described in U.S. Pat. No. 4,321,165, Smith et al, issued Mar. 23, 1982, incorporated herein by reference. However, the compositions preferably contain less than about 10%, more preferably less than about 5%, of phosphate materials. Most preferably, the compositions are substantially free of phosphates. Preferred builders are the polycarboxylate materials described in U.S. Pat. No. 4,284,532, Leikhim et al, issued Aug. 18, 1981, incorporated herein by reference. Citric acid is particularly preferred.

Other optional components for use in the liquid detergents herein include enzymes, enzyme stabilizing agents, polyacids, soil removal agents, antiredeposition agents, suds regulants, hydrotropes, opacifiers, antioxidants, bactericides, dyes, perfumes, and other brighteners known in the art. Such optional components generally represent less than about 15%, preferably from about 2% to about 10%, by weight of the composition.

The following examples illustrate the compositions of the present invention.

All parts, percentages and ratios used herein are by weight unless otherwise specified.

EXAMPLE I

The fabric staining tendency of various brighteners was evaluated in the following composition.

| Component | Wt. % |
|---|---|
| $C_{13}$ linear alkylbenzene sulfonic acid | 7.2 |
| $C_{14-15}$ alkyl polyethoxylate (2.25) sulfuric acid | 10.8 |
| $C_{12-13}$ alcohol polyethoxylate (6.5)* | 6.5 |
| $C_{12}$ alkyl trimethylammonium chloride | 1.2 |
| $C_{12-14}$ fatty acid | 13.0 |
| Oleic acid | 2.0 |
| Citric acid (anhydrous) | 4.0 |
| Diethylenetriamine pentaacetic acid | 0.23 |
| TEPA-$E_{15-18}$** | 1.5 |
| Monoethanolamine | 2.0 |
| Sodium ion | 1.66 |
| Potassium ion | 2.65 |
| Propylene glycol | 7.25 |
| Ethanol | 7.75 |
| Formic acid | 0.66 |
| Brightener | As indicated |
| Minors and water | Balance to 100 |

*Alcohol and monoethoxylated alcohol removed.
**Tetraethylene pentaimine ethoxylated with 15-18 moles (avg.) of ethylene oxide at each hydrogen site.

Brightener

A=0.13% disodium 4,4'-bis((4-anilino-6-methylhydroxyethylamino-1,3,5-triazin-2-yl)amino)-2,2'-stilbene disulfonate
+0.076% dipotassium 4,4'-bis(4-phenyl-1,2,3-triazol-2-yl)stilbene-2,2'-disulfonate
B=0.2% C.I. Fluorescent Brightener 230
C=0.2% of a hexasulfonated stilbene brightener
D=0.2% tetrasodium 4,4'-bis((4-[bis(2-hydroxyethyl-)amino]-6-(p-sulfoanilino)-1,3,5-triazin-2-yl)amino)-2,2'-stilbene disulfonate
E=0.2% sodium 4-(2H-naphtho[1,2-d]triazol-2-yl)-2-stilbenesulfonate)

The above brighteners are preferably added to the composition as a premix containing, on a finished product basis, 2% monoethanolamine, 2% alcohol polyethoxylate and 2% water, to aid their solubilization.

Samples containing the above brighteners were applied to 100% cotton swatches (unbrightened unless otherwise noted), both damp and dry, for 10 minutes, and to dry swatches for 1 hour. The swatches were then washed, dried and graded under ultraviolet light for brightener staining by a panel of expert graders, using the following scale.

O=no visible stain
T=trace of stain
1.0=very light stain
1.5=light stain
2.0=medium light stain
2.5=medium stain
3.0=heavy stain The results, after averaging the grades, were as follows.

| | | Grade | | |
|---|---|---|---|---|
| Fabric | Brightener | Dry 10 min | Damp 10 min | Dry 1 hr |
| Prebrightened shirt | A | 2.5 | 2.3 | 2.3 |
| Prebrightened shirt | B | 3.1 | 3.3 | 3.3 |
| Prebrightened shirt | C | 2.2 | 2.7 | 1.9 |
| Prebrightened shirt | D | 3.2 | 3.5 | 3.1 |
| Prebrightened shirt | E | 0 | T | T |
| Underwear | A | 2.1 | 2.8 | 2.3 |
| " | B | 2.7 | 3.0 | 3.1 |
| " | C | 1.3 | 2.3 | 1.3 |
| " | D | 2.8 | 3.5 | 2.3 |
| " | E | T | 1.0 | T |
| Coarse weave cotton | A | 3.6 | 3.0 | 3.3 |
| Coarse weave cotton | B | 4.0 | 3.7 | 3.7 |
| Coarse weave cotton | C | 2.6 | 2.3 | 2.3 |
| Coarse weave cotton | D | 3.2 | 3.3 | 3.4 |
| Coarse weave cotton | E | 1.3 | 1.3 | 1.3 |
| Cotton sweater | A | 2.4 | 2.8 | 2.5 |
| " | B | 3.3 | 3.3 | 3.2 |
| " | C | 2.2 | 2.4 | 2.2 |
| " | D | 3.2 | 3.1 | 3.2 |
| " | E | 1.0 | 1.0 | 1.0 |
| Blue cotton | A | 3.5 | 2.6 | 2.8 |
| " | B | 2.7 | 3.1 | 3.3 |
| " | C | 1.0 | 1.6 | 1.0 |
| | D | 2.1 | 2.7 | 2.7 |
| " | E | 0 | 0 | 0 |

Brightener E of the present invention caused much less staining of cotton fabrics than the other brighteners.

EXAMPLE II

Example I was repeated (10 minute application only) using the following brighteners.

A=0.13% disodium 4,4'-bis((4-anilino-6-methylhydroxyethylamino-1,3,5-triazin-2-yl)amino)-2,2'-stilbene disulfonate
+0.076% dipotassium 4,4'-bis(4-phenyl-1,2,3-triazol-2-yl)stilbene-2,2'-disulfonate
B=0.2% C.I. Fluorescent Brightener 71 (a disulfonate)
C=0.2% C.I. Fluorescent Brightener 230
D=0.2% of an anionic stilbene brightener
E=0.2% sodium 4-(2H-naphtho[1,2-d]triazol-2-yl)-2-stilbenesulfonate)

| | | Grade | |
|---|---|---|---|
| Fabric | Brightener | Dry/10 min. | Damp/10 min. |
| Prebrightened shirt | A | 1.9 | 2.7 |
| Prebrightened shirt | B | 1.8 | 2.8 |
| Prebrightened shirt | C | 2.5 | 3.5 |
| Prebrightened shirt | D | 2.0 | 3.3 |
| Prebrightened shirt | E | 0 | T |
| Underwear | A | 1.8 | 1.8 |
| " | B | 1.7 | 2.2 |
| " | C | 2.3 | 2.8 |
| " | D | 2.0 | 2.5 |
| " | E | 0 | 0 |
| Coarse weave cotton | A | 2.8 | 2.8 |
| Coarse weave cotton | B | 2.3 | 2.9 |
| Coarse weave cotton | C | 3.2 | 3.2 |
| Coarse weave cotton | D | 2.8 | 2.7 |

-continued

| Fabric | Brightener | Grade Dry/10 min. | Grade Damp/10 min. |
|---|---|---|---|
| Coarse weave cotton | E | T | T |
| Cotton sweater | A | 2.5 | 2.6 |
| " | B | 2.7 | 2.4 |
| " | C | 3.1 | 3.1 |
| " | D | 3.1 | 3.1 |
| " | E | T | T |
| Blue cotton | A | 1.9 | 1.8 |
| " | B | 1.8 | 1.8 |
| " | C | 2.5 | 2.6 |
| " | D | 2.0 | 2.2 |
| " | E | 0 | 0 |
| White T-shirt | A | T | 1.0 |
| " | B | 0.5 | 1.0 |
| " | C | 1.3 | 1.3 |
| " | D | 0.5 | 1.2 |
| " | E | 0 | 0 |

In the above testing, Brightener E of the present invention caused much less staining of cotton fabrics.

EXAMPLE III

Various brighteners were again evaluated as described in Example I, except using the following grading scale.

O=no visible stain
T=possible trace
1=very slight stain
2=light but definite stain
3=very visible stain
4=stained the most possible Brightener A=0.13% disodium 4,4'-bis((4-anilino-6-methylhydroxyethylamino-1,3,5-triazin-2-yl)amino)-2,2'-stilbene disulfonate
+0.076% dipotassium 4,4'-bis(4-phenyl-1,2,3-triazol-2-yl)stilbene-2,2'-disulfonate
B=0.15% sodium 4-(2H-naphtho[1,2-d]triazol-2-yl)-2-stilbenesulfonate)+0.05% of dipotassium 4,4'-bis(4-phenyl-1,2,3-triazol-2-yl)stilbene-2,2'-disulfonate
C=0.18% sodium 4-(2H-naphtho[1,2-d]triazol-2-yl)-2-stilbenesulfonate)+0.02% of dipotassium 4,4'-bis(4-phenyl-1,2,3-triazol-2-yl)stilbene-2,2'-disulfonate
D=0.2% sodium 4-(2H-naphtho[1,2-d]triazol-2-yl)-2-stilbenesulfonate)

| Fabric | Brightener | Grade 10 min/dry |
|---|---|---|
| Prebrightened shirt | A | 4.0 |
| Prebrightened shirt | B | 3.0 |
| Prebrightened shirt | C | 1.5 |
| Prebrightened shirt | D | T |
| Underwear | A | 3.0 |
| " | B | 2.0 |
| " | C | 1.0 |
| " | D | T |
| Coarse weave cotton | A | 4.0 |
| Coarse weave cotton | B | 3.0 |
| Coarse weave cotton | C | 2.0 |
| Coarse weave cotton | D | 1.0 |
| Cotton sweater | A | 4.0 |

-continued

| Fabric | Brightener | Grade 10 min/dry |
|---|---|---|
| " | B | 2.0 |
| " | C | 1.0 |
| " | D | T |
| Blue cotton | A | 3.0 |
| " | B | T |
| " | C | 0 |
| " | D | 0 |
| White T-shirt | A | 2.3 |
| " | B | 0 |
| " | C | 0 |
| " | D | 0 |

Brighteners B (with 75% of total brightener being D), C (with 90% of total brightener being D), and D of the present invention again caused less staining of cotton fabrics.

EXAMPLE IV

The following brighteners were evaluated, as described in Example III.

A=0.13% disodium 4,4'-bis((4-anilino-6-methylhydroxyethylamino-1,3,5-triazin-2-yl)amino)-2,2'-stilbene disulfonate
+0.076% dipotassium 4,4'-bis(4-phenyl-1,2,3-triazol-2-yl)stilbene-2,2'-disulfonate
B=0.1% sodium 4-(2H-naphtho[1,2-d]triazol-2-yl)-2-stilbenesulfonate)
C=0.15% sodium 4-(2H-naphtho[1,2-d]triazol-2-yl)-2-stilbenesulfonate)
D=0.2% sodium 4-(2H-naphtho[1,2-d]triazol-2-yl)-2-stilbenesulfonate)

| Fabric | Brightener | Grade 10 min/dry |
|---|---|---|
| Prebrightened shirt | A | 3.5 |
| Prebrightened shirt | B | 0 |
| Prebrightened shirt | C | 0 |
| Prebrightened shirt | D | 0 |
| Underwear | A | 3.5 |
| " | B | 0 |
| " | C | 0 |
| " | D | 0 |
| Coarse weave cotton | A | 3.5 |
| Coarse weave cotton | B | 1.0 |
| Coarse weave cotton | C | 1.5 |
| Coarse weave cotton | D | 1.5 |
| Cotton sweater | A | 4.0 |
| " | B | 1.0 |
| " | C | 1.0 |
| " | D | 1.0 |
| Blue cotton | A | 3.0 |
| " | B | 0 |
| " | C | 0 |
| " | D | 0 |
| White T-shirt | A | 1.3 |
| " | B | 0 |
| " | C | 0 |
| " | D | 0 |

The above results show that Brighteners B, C and D of the present invention caused little or no staining at levels between 0.1% and 0.2%.

EXAMPLE V

The following brighteners were evaluated as described in Example III under various pretreatment times and conditions.

A=0.13% disodium 4,4'-bis((4-anilino-6-methylhydroxyethylamino-1,3,5-triazin-2-yl)amino)-2,2'-stilbene disulfonate +0.076% dipotassium 4,4'-bis(4-phenyl-1,2,3-triazol-2-yl)stilbene-2,2'-disulfonate B=0.2% sodium 4-(2H-naphtho[1,2-d]triazol-2-yl)-2-stilbenesulfonate)

C=0.18% sodium 4-(2H-naphtho[1,2-d]triazol-2-yl)-2-stilbenesulfonate)+0.02% disodium 4,4'-bis((4-anilino-6-methylhydroxyethylamino-1,3,5-triazin-2-yl)amino)-2,2'-stilbene disulfonate D=0.15% sodium 4-(2H-naphtho[1,2-d]triazol-2-yl)-2-stilbenesulfonate)+0.05% disodium 4,4'-bis((4-anilino-6-methylhydroxyethylamino-1,3,5-triazin-2-yl)amino)-2,2'-stilbene disulfonate After 10 minutes on Dry Fabric

| Fabric | Brightener | Pretreat Condition** 1 | 2 | 3 | 4 |
|---|---|---|---|---|---|
| Cotton sweater | A | 4.0 | 4.0 | 3.5 | 3.5 |
| " | B | 1.0 | 1.0 | T | T |
| " | C | 2.0 | 2.0 | 2.0 | 2.0 |
| " | D | 3.0 | 3.0 | 2.0 | 2.0 |
| Coarse weave cotton | A | 4.0 | 4.0 | 3.5 | 4.0 |
| Coarse weave cotton | B | 1.0 | 1.0 | 1.0 | 1.0 |
| Coarse weave cotton | C | 2.0 | 2.5 | 2.0 | 1.5 |
| Coarse weave cotton | D | 3.0 | 3.0 | 3.0 | 2.5 |
| White cotton pants | A | 4.0 | 4.0 | 4.0 | — |
| " | B | 1.0 | 1.0 | T | — |
| " | C | 2.0 | 1.5 | 2.0 | — |
| " | D | 3.0 | 2.0 | 2.5 | — |

After 10 minutes on Damp Fabric

| Fabric | Brightener | Pretreat Condition** 1 | 2 | 3 | 4 |
|---|---|---|---|---|---|
| Cotton sweater | A | 4.0 | 4.0 | 4.0 | 3.5 |
| " | B | 1.0 | T | T | 1.0 |
| " | C | 1.5 | 1.0 | 1.0 | 2.0 |
| " | D | 3.0 | 2.0 | 2.0 | 2.0 |
| Coarse weave cotton | A | 4.0 | 4.0 | 4.0 | 4.0 |
| Coarse weave cotton | B | 1.0 | T | 1.0 | 1.0 |
| Coarse weave cotton | C | 2.5 | 2.0 | 2.0 | 2.0 |
| Coarse weave cotton | D | 3.0 | 3.0 | 3.0 | 3.0 |
| White cotton pants | A | 4.0 | 4.0 | 4.0 | — |
| " | B | 1.0 | T | T | — |
| " | C | 2.0 | 1.5 | 1.0 | — |
| " | D | 3.0 | 2.5 | 2.0 | — |

Overnight on Dry Fabric

| Fabric | Brightener | Pretreat Condition** 1 | 2 | 3 | 4 |
|---|---|---|---|---|---|
| Cotton sweater | A | 4.0 | 3.0 | 4.0 | 4.0 |
| " | B | 1.0 | 1.0 | 1.0 | 1.0 |
| " | C | 2.5 | 2.0 | 2.5 | 2.0 |
| " | D | 3.0 | 3.0 | 3.0 | 3.0 |
| Coarse weave cotton | A | 4.0 | 4.0 | 4.0 | 4.0 |
| Coarse weave cotton | B | 1.5 | 2.0 | 1.0 | 2.5 |
| Coarse weave cotton | C | 2.0 | 3.0 | 2.0 | 3.0 |
| Coarse weave cotton | D | 3.0 | 3.0 | 3.0 | 3.0 |
| White cotton pants | A | 4.0 | 4.0 | 4.0 | 3.5 |
| " | B | 1.0 | 1.0 | 2.0 | 1.0 |
| " | C | 2.5 | 2.0 | 2.0 | 1.5 |
| " | D | 3.0 | 2.0 | 3.0 | 1.5 |
| Gray corduroy pants | A | 3.0 | 3.5 | 2.5 | — |
| " | B | 0.5 | 1.5 | 1.0 | — |
| " | C | 1.5 | 1.5 | 1.5 | — |
| " | D | 2.0 | 1.5 | 1.5 | — |
| Unbleached muslin tablecloth | A | 4.0 | 4.0 | 4.0 | — |
| Unbleached muslin tablecloth | B | 2.0 | 2.0 | 2.0 | — |
| Unbleached muslin tablecloth | C | 2.5 | -2.5 | 3.0 | — |
| Unbleached muslin tablecloth | D | 3.0 | 3.0 | 3.0 | — |

Overnight on Damp Fabric

| Fabric | Brightener | Pretreat Condition** 1 | 2 | 3 | 4 |
|---|---|---|---|---|---|
| Cotton sweater | A | 4.0 | 4.0 | 4.0 | 4.0 |
| " | B | 1.5 | 2.5 | 2.0 | T |
| " | C | 2.5 | 2.5 | 3.0 | 2.0 |
| " | D | 3.5 | 3.0 | 3.0 | 3.0 |
| Coarse weave cotton | A | 4.0 | 4.0 | 4.0 | — |
| Coarse weave cotton | B | 1.5 | 2.0 | 2.0 | 2.5 |
| Coarse weave cotton | C | 2.5 | 3.0 | 3.0 | 3.0 |
| Coarse weave cotton | D | 3.0 | 3.0 | 3.0 | 3.0 |
| White cotton pants | A | 4.0 | 4.0 | 4.0 | 3.5 |
| " | B | 2.0 | 1.0 | 1.5 | T |
| " | C | 2.0 | 2.0 | 2.0 | 1.5 |
| " | D | 2.5 | 3.0 | 3.0 | 2.5 |
| Gray corduroy pants | A | 4.0 | 3.5 | 3.5 | — |
| " | B | 2.5 | 2.0 | 2.0 | — |
| " | C | 2.5 | 2.0 | 2.0 | — |
| " | D | 3.0 | 3.0 | 2.0 | — |
| Unbleached muslin tablecloth | A | 4.0 | 4.0 | 4.0 | — |
| Unbleached muslin tablecloth | B | 3.0 | 2.0 | 2.5 | — |
| Unbleached muslin tablecloth | C | 3.0 | 3.0 | 3.0 | — |
| Unbleached muslin tablecloth | D | 3.0 | 3.0 | 3.5 | — |

**1 = 1 ml of product applied
2 = 1 ml of product applied + rub 5 times
3 = 2 ml of product applied + scrub for 10 seconds
4 = 1 ml of product applied + rub + rinse Brighteners B, C (with 90% of total brightener being B), and D (with 75% of total brightener being B) of the present invention provided less staining of cotton fabrics.

EXAMPLE VI

Brightener staining was evaluated as described in Example III using the following compositions.

Composition A=a commercially available detergent believed to contain the following components.

| Component | Wt. % |
|---|---|
| $C_{11.3}$ linear alkylbenzene sulfonate | 17.5 |
| $C_{12-15}$ alcohol polyethoxylate(8) | 7.0 |
| Sodium citrate | 10.1 |
| Xylene sulfonate | 5.2 |
| Monoethanolamine | 2.0 |
| Methylcellulose | 0.7 |
| Disodium 4,4'-bis((4-anilino-6-morpholino-1,3,5-triazin-2-yl) amino)-2,2'-stilbene disulfonate | 0.05 |
| Sodium 4-(2H—naphtho [1,2-d] triazol-2-yl)-2-stilbenesulfonate | 0.04 |
| Water + minors | Balance to 100 |

Composition B

| Component | Wt. % |
|---|---|
| $C_{12-13}$ alcohol polyethoxylate (6.5) | 21.5 |
| Sodium $C_{12-14}$ alcohol polyethoxylate (3) sulfate | 11.6 |
| Ethanol | 10.0 |
| Disodium 4,4'-bis((4-anilino-6-methylhydroxyethylamino-1,3,5-triazin-2-yl)amino)-2,2'-stilbene disulfonate | 0.21 |
| Water + minors | Balance to 100 |

Composition C=Composition B except replace indicated brightener with 0.2% of sodium 4-(2H-naphtho[1,2-d]triazol-2-yl)-2-stilbenesulfonate.

Composition D=Composition B except replace indicated brightener with 0.13% disodium 4,4'-bis((4-anilino-6-methylhydroxyethylamino-1,3,5-triazin-2-yl)amino)-2,2'-stilbene disulfonate and 0.076% of dipotassium 4,4'bis-(4-phenyl-1,2,3-triazol-2-yl)stilbene-2,2'-disulfonate.

Composition E=Composition of Example I with 0.13% of disodium 4,4'-bis((4-anilino-6-methylhydroxyethylamino-1,3,5-triazin-2-yl)amino)-2,2'-stilbene disulfonate and 0.076% of dipotassium 4,4'-bis(4-phenyl-1,2,3-triazol-2-yl)stilbene-2,2'-disulfonate.

Composition F=Composition of Example I with 0.15% of sodium 4-(2H-naphtho[1,2-d]triazol-2-yl)-2-stilbenesulfonate and 0.05% of disodium 4,4'-bis((4-anilino-6-methylhydroxyethylamino-1,3,5-triazin-2-yl)amino)-2,2'-stilbene disulfonate.

Composition G=Composition of Example I with 0.15% of sodium 4-(2H-naphtho[1,2-d]triazol-2-yl)-2-stilbenesulfonate and 0.02% of disodium 4,4'-bis((4-anilino-6-methylhydroxyethylamino-1,3,5-triazin-2-yl)amino)-2,2'-stilbene disulfonate.

Composition H=Composition of Example I with 0.15% of sodium 4-(2H-naphtho[1,2-d]triazol-2-yl)-2-stilbenesulfonate The results were as follows.

| | | Grade | |
|---|---|---|---|
| Fabric | Composition | 10 min/dry | overnight/damp |
| Cotton sweater | A | 3.0 | 3.3 |
| " | B | 3.0 | 4.0 |
| " | C | T | 2.8 |
| " | D | 3.5 | 4.0 |
| " | E | 4.0 | 4.0 |
| " | F | 3.3 | 3.0 |
| " | G | 2.3 | 2.5 |
| " | H | 1.0 | 2.5 |
| Coarse weave cotton | A | 3.0 | 3.5 |
| Coarse weave cotton | B | 3.0 | 4.0 |
| Coarse weave cotton | C | T | 2.3 |
| Coarse weave cotton | D | 3.5 | 3.5 |
| Coarse weave cotton | E | 4.0 | 4.0 |
| Coarse weave cotton | F | 3.0 | 3.0 |
| Coarse weave cotton | G | 2.5 | 3.0 |
| Coarse weave cotton | H | 1.3 | 2.3 |
| White T-shirt | A | 1.5 | 1.0 |
| " | B | 1.5 | 4.0 |
| " | C | 0 | 2.0 |
| " | D | T | 3.0 |
| " | E | 1.0 | 3.0 |
| " | F | 1.0 | 2.5 |
| " | G | T | 2.0 |
| '0 " | H | 0 | 2.0 |

Compositions C, G and H of the present invention caused less staining of cotton fabrics than the other compositions. Composition F of the invention caused less staining than Composition E, and about the same level of staining as Composition A even though F contained more than twice the level of brightener in A.

EXAMPLE VII

Brightener staining was evaluated as described in Example VI on a wide variety of fabrics, using the following compositions.

Composition A=Composition E from Example VI

Composition B=Composition H from Example VI

Composition C=Composition B from Example VI

Composition D=Composition B from Example VI, except replace indicated brightener with the brightener mixture of Composition G of Example VI.

Composition E=Composition G from Example VI.

The results were as follows.

| | | Grade | |
|---|---|---|---|
| Fabric | Composition | 10 min/dry | overnight/damp |
| Polycotton (84% C) | A | 2.0 | 3.0 |
| Polycotton (84% C) | B | 0 | T |
| Polycotton (84% C) | C | 3.0 | 4.0 |
| Polycotton (84% C) | D | 2.0 | 3.0 |
| Polycotton (84% C) | E | T | 2.5 |
| Coarse weave cotton | A | 4.0 | 4.0 |
| Coarse weave cotton | B | 1.0 | 2.0 |
| Coarse weave cotton | C | 3.0 | 3.0 |
| Coarse weave cotton | D | 2.0 | 3.0 |
| Coarse weave cotton | E | 3.0 | 3.0 |
| Cotton denim | A | 3.0 | 4.0 |
| " | B | 0 | 0 |
| " | C | 3.5 | 3.5 |
| " | D | 2.0 | 2.0 |
| | E | 1.0 | 1.5 |
| Polycotton (50% C) | A | 0 | 2.0 |
| Polycotton | B | 0 | T |

-continued

| Fabric | Composition | Grade | |
|---|---|---|---|
| | | 10 min/dry | overnight/damp |
| (50% C) | | | |
| Polycotton (50% C) | C | 0 | 2.0 |
| Polycotton (50% C) | D | 0 | 0 |
| Polycotton (50% C) | E | 0 | T |
| Underwear | A | 3.5 | 4.0 |
| " | B | T | 2.5 |
| " | C | 4.0 | 4.0 |
| " | D | 3.0 | 3.5 |
| " | E | 2.0 | 3.0 |
| Muslin | A | 4.0 | 4.0 |
| " | B | 1.0 | 2.5 |
| " | C | 4.0 | 4.0 |
| " | D | 2.0 | 3.0 |
| " | E | 2.0 | 3.0 |
| " | A | 3.5 | 3.5 |
| " | B | 0 | 1.0 |
| " | C | 4.0 | 4.0 |
| " | D | 2.0 | 2.0 |
| " | E | 2.0 | 2.0 |
| Silk | A | 2.0 | 4.0 |
| " | B | 1.0 | 3.0 |
| " | C | 1.0 | 1.5 |
| " | D | T | 1.5 |
| " | E | 1.0 | 3.0 |
| Rayon | A | 4.0 | 4.0 |
| " | B | 1.0 | 2.0 |
| " | C | 4.0 | 4.0 |
| " | D | 3.0 | 3.0 |
| " | E | 3.0 | 3.5 |

On polycotton (35% C), wool, polyester and triacetate fabrics, all grades were "0" except for grades of "T" for overnight contact of Composition A on polycotton (35% C), D on wool, and B and E on triacetate, and for 10 minute contact of Composition E on triacetate.

The above results show that Compositions B, D and E of the present invention cause less staining on a variety of fabrics.

EXAMPLE VIII

Brightener staining was evaluated as described in Example III, using the following brighteners.

A=0.13% disodium 4,4'-bis((4-anilino-6-methylhydroxyethylamino-1,3,5-triazin-2-yl)amino)-2,2'-stilbene disulfonate
+0.076% dipotassium 4,4'-bis(4-phenyl-1,2,3-triazol-2-yl)stilbene-2,2'-disulfonate B=0.15% sodium 4-(2H-naphtho[1,2-d]triazol-2-yl)-2-stilbenesulfonate)

C=B+0.01% disodium 4,4'-bis((4-anilino-6-methylhydroxyethylamino-1,3,5-triazin-2-yl)amino)-2,2'-stilbene disulfonate D=B+0.015% disodium 4,4'-bis((4-anilino-6-methylhydroxyethylamino-1,3,5-triazin-2-yl)amino)-2,2'-stilbene disulfonate E=B+0.02% disodium 4,4'-bis((4-anilino-6-methylhydroxyethylamino-1,3,5-triazin-2-yl)amino)-2,2'-stilbene disulfonate

| Fabric | Composition | Grade | |
|---|---|---|---|
| | | 10 min/dry | overnight/damp |
| Coarse weave cotton | A | 3.5 | 4.0 |
| Coarse weave cotton | B | 1.0 | 1.5 |

-continued

| Fabric | Composition | Grade | |
|---|---|---|---|
| | | 10 min/dry | overnight/damp |
| Coarse weave cotton | C | 2.0 | 2.5 |
| Coarse weave cotton | D | 2.0 | 2.0 |
| Coarse weave cotton | E | 2.0 | 2.0 |
| Cotton sweater | A | 3.8 | 4.0 |
| " | B | T | 2.0 |
| " | C | 1.5 | 3.0 |
| " | D | 1.8 | 2.0 |
| " | E | 1.5 | 2.0 |
| Unbleached muslin | A | 3.0 | 4.0 |
| " | B | 0.5 | 2.3 |
| " | C | 1.0 | 1.5 |
| " | D | 1.5 | 2.0 |
| " | E | 1.5 | 2.3 |
| Underwear | A | 3.0 | 4.0 |
| " | B | T | 3.0 |
| " | C | 1.3 | 3.0 |
| " | D | 1.3 | 3.0 |
| " | E | 1.3 | 3.0 |
| White T-shirt | A | 1.8 | 3.0 |
| " | B | 0 | T |
| " | C | 0 | 1.3 |
| " | D | 0 | 1.0 |
| " | E | T | 1.8 |

Brighteners B, C, D and E of the invention caused less staining than Brightener A.

EXAMPLE IX

Brightener staining was evaluated as described in Example VI using the following compositions.

Composition A=Composition E of Example VI.
Composition B=Composition G of Example VI.
Composition C

| Component | Wt. % |
|---|---|
| $C_{13}$ linear alkylbenzene sulfonic acid | 7.2 |
| $C_{14-15}$ alkyl polyethoxylate (2.25) sulfuric acid | 10.8 |
| $C_{12-13}$ alcohol polyethoxylate (6.5)* | 5.0 |
| $C_{12}$ alkyl trimethylammonium chloride | 1.2 |
| $C_{12-14}$ fatty acid | 10.0 |
| Citric acid (anhydrous) | 4.0 |
| Diethylenetriamine pentaacetic acid | 0.23 |
| TEPA-$E_{15-18}$** | 2.0 |
| Monoethanolamine | 2.0 |
| Sodium ion | 1.66 |
| Potassium ion | 2.65 |
| Propylene glycol | 2.5 |
| Ethanol | 8.0 |
| Formic acid | 0.66 |
| Disodium 4,4'-bis((4-anilino-6-methylhydroxyethylamino-1,3,5-triazin-2-yl)amino)-2,2'-stilbene disulfonate | 0.13 |
| Dipotassium 4,4'-bis(4-phenyl-1,2,3-triazol-2-yl)stilbene-2,2'-disulfonate | 0.076 |
| Minors and water | Balance to 100 |

*Alcohol and monoethoxylated alcohol removed.
**Tetraethylene pentaimine ethoxylated with 15-18 moles (avg.) of ethylene oxide at each hydrogen site.

Composition D=Composition C, except replace indicated brighteners with 0.15% of sodium 4-(2H-naphtho[1,2-d]triazol-2-yl)-2-stilbenesulfonate and 0.02% of disodium 4,4'-bis((4-anilino-6-methylhydroxyethylamino-1,3,5-triazin-2-yl)amino)-2,2'-stilbene disulfonate.

Composition E=Composition C, except replace indicated brighteners with 0.15% of sodium 4-(2H-naphtho[1,2-d]triazol-2-yl)-2-stilbenesulfonate.

The results were as follows.

| Fabric | Composition | Grade 10 min/dry | Grade overnight/damp |
|---|---|---|---|
| Coarse weave cotton | A | 3.5 | 4.0 |
| Coarse weave cotton | B | 2.0 | 2.5 |
| Coarse weave cotton | C | 4.0 | 4.0 |
| Coarse weave cotton | D | 2.0 | 2.0 |
| Coarse weave cotton | E | 1.0 | 1.5 |
| Cotton sweater | A | 3.5 | 3.5 |
| " | B | 1.5 | 2.5 |
| " | C | 2.5 | 3.5 |
| " | D | 1.5 | 1.8 |
| " | E | T | 1.5 |
| Unbleached muslin | A | 3.0 | 3.5 |
| " | B | 1.8 | 2.0 |
| " | C | 3.0 | 3.5 |
| " | D | 1.0 | 2.0 |
| " | E | T | 2.0 |
| Underwear | A | 2.5 | 4.0 |
| " | B | 1.5 | 2.5 |
| " | C | 2.5 | 3.8 |
| " | D | 1.5 | 2.5 |
| " | E | 0 | 2.5 |
| White T-shirt | A | T | 2.5 |
| " | B | 0 | 1.0 |
| " | C | T | 2.5 |
| " | D | 0 | 1.0 |
| " | E | 0 | T |

Compositions B, D and E of the invention all caused less staining of the cotton fabrics.

EXAMPLE X

Brightener staining was evaluated as described in Example IX using the following compositions.

Composition A=Composition C of Example IX

Composition B=Composition E of Example IX

Composition C=Composition D of Example IX

Composition D=Composition C of Example IX, except replace indicated brighteners with 0.2% of sodium 4,4'-bis((4-anilino-6-morpholino-1,3,5-triazin-2-yl)amino)-2-stilbene sulfonate.

Composition E=Composition C of Example IX, except replace indicated brighteners with 0.2% of 4,4'-bis((4-anilino-6-morpholino-1,3,5-triazin-2-yl)amino)-stilbene. (Brightener not solubilized in composition.)

Composition F=Composition C of Example IX, except replace indicated brighteners with 0.2% of disodium 4,4'-bis((4-anilino-6-morpholino-1,3,5-triazin-2-yl)amino)-2,2'-stilbene disulfonate.

Composition G=Composition D, except with only 0.15% of the indicated brightener.

Composition H=Composition F, except with only 0.15% of the indicated brightener.

The results were as follows.

| Fabric | Composition | Grade 10 min/dry | Grade overnight/damp |
|---|---|---|---|
| Coarse weave cotton | A | 4.0 | 4.0 |
| Coarse weave cotton | B | 1.5 | 2.0 |
| Coarse weave cotton | C | 2.5 | 2.5 |
| Coarse weave cotton | D | 2.0 | 3.0 |
| Coarse weave cotton | E | 4.0 | 1.5 |
| Coarse weave cotton | F | 4.0 | 4.0 |
| Coarse weave cotton | G | 1.5 | 3.0 |
| Coarse weave cotton | H | 2.0 | 4.0 |
| Cotton sweater | A | 4.0 | 4.0 |
| " | B | 1.0 | 2.5 |
| " | C | 1.5 | 3.0 |
| " | D | 2.5 | 3.5 |
| " | E | 2.0 | 1.5 |
| " | F | 4.0 | 4.0 |
| " | G | 2.5 | 3.0 |
| " | H | 4.0 | 4.0 |
| Unbleached muslin | A | 3.5 | 4.0 |
| " | B | 0 | 2.5 |
| " | C | 1.5 | 3.5 |
| " | D | 2.0 | 3.5 |
| " | E | 0 | 1.0 |
| " | F | 3.5 | 4.0 |
| " | G | 2.5 | 2.5 |
| " | H | 3.0 | 3.5 |
| Underwear | A | 2.0 | 4.0 |
| " | B | T | 2.0 |
| " | C | T | 2.5 |
| " | D | T | 3.0 |
| " | E | T | 0 |
| " | F | 2.5 | 4.0 |
| " | G | 2.0 | 3.0 |
| " | H | 3.0 | 4.0 |
| White T-shirt | A | 0 | 3.0 |
| " | B | 0 | 0 |
| " | C | 0 | 1.5 |
| " | D | 0 | 2.5 |
| " | E | 0 | 0 |
| " | F | T | 3.0 |
| " | G | 0 | 3.0 |
| " | H | 0 | 3.0 |

Compositions B, C, D and G of the present invention caused less staining of the cotton fabrics. While the preferred monosulfonated brightener in Composition B causes less staining than the brightener in G, the brightener in G provides better whitening performance.

EXAMPLE XI

Brightener staining was evaluated as described in Example IX using the following compositions.

Composition A=Composition C of Example IX

Composition B=Composition E of Example IX

Composition C=Composition D of Example IX

Composition D=Composition C of Example IX, except replace indicated brighteners with 0.2% of disodium 2,2-(4,4'-biphenylene divinylene)-dibenzenesulfonate.

Composition E=Composition C of Example IX, except replace indicated brighteners with 0.12% of sodium 4-(2H-naphtho[1,2-d]triazol-2-yl)-2-stilbenesulfonate and 0.06% of disodium 2,2-(4,4'-biphenylene divinylene)dibenzenesulfonate.

Composition F=Composition C of Example IX, except replace indicated brighteners with 0.15% of sodium 4-(2H-naphtho[1,2-d]triazol-2-yl)-2-stilbenesulfonate and 0.02% of disodium 2,2-(4,4'-biphenylene divinylene)dibenzenesulfonate.

Composition G=Composition C of Example IX, except replace indicated brighteners with 0.096% of sodium 4-(2H-naphtho[1,2-d]triazol-2-yl)-2-stilbenesulfonate and 0.088% of disodium 2,2-(4,4'-biphenylene divinylene)-dibenzenesulfonate.

The results were as follows.

| Fabric | Compostion | Grade | |
|---|---|---|---|
| | | 10 min/dry | overnight/damp |
| Coarse weave cotton | A | 3.5 | 4.0 |
| Coarse weave cotton | B | 1.5 | 2.0 |
| Coarse weave cotton | C | 2.0 | 2.5 |
| Coarse weave cotton | D | 3.0 | 4.0 |
| Coarse weave cotton | E | 2.5 | 2.0 |
| Coarse weave cotton | F | 2.0 | 1.5 |
| Coarse weave cotton | G | 4.0 | 2.5 |
| Cotton sweater | A | 3.0 | 4.0 |
| " | B | 1.0 | 2.0 |
| " | C | 1.0 | 2.5 |
| " | D | 3.0 | 4.0 |
| " | E | 2.5 | 3.5 |
| " | F | 2.5 | 2.0 |
| " | G | 2.5 | 2.5 |
| Unbleached muslin | A | 2.0 | 3.0 |
| " | B | T | T |
| " | C | T | 1.5 |
| " | D | 2.5 | 3.5 |
| " | E | 1.0 | 2.0 |
| " | F | T | 1.5 |
| " | G | 1.5 | 1.0 |
| Underwear | A | 1.5 | 3.5 |
| " | B | 0 | 1.0 |
| " | C | T | 1.0 |
| " | D | 2.0 | 3.5 |
| " | E | T | 2.0 |
| " | F | T | 2.0 |
| " | G | 1.5 | 2.5 |
| White T-shirt | A | T | 2.5 |
| " | B | 0 | T |
| " | C | 0 | 1.0 |
| " | D | T | 3.0 |
| " | E | 0 | 1.0 |
| " | F | T | T |
| " | G | T | 2.0 |

Compositions B, C, E and F of the present invention caused less staining of the cotton fabrics.

EXAMPLE XII

Brightener staining was evaluated as described in Example III using the following compositions.

| Component | Wt. % | | | | | |
|---|---|---|---|---|---|---|
| | A | B | C | D | E | F |
| $C_{14-15}$ alcohol polyethoxylate (7) | 40.0 | 40.0 | 40.0 | 30.0 | 5.0 | 5.0 |
| Sodium $C_{13}$ linear alkylbenzene sulfonate | — | — | — | 10.0 | 5.0 | 5.0 |
| Coconut alkyl diethanolamide | — | — | — | — | 0.5 | 0.5 |
| $C_{12-14}$ fatty acid | 5.6 | 5.6 | 5.6 | 5.6 | — | — |
| Sodium pyrophosphate | — | — | — | — | 5.0 | 5.0 |
| Sodium borax | — | — | — | — | 2.0 | 2.0 |
| Ethanol | 3.0 | 3.0 | 3.0 | 3.0 | — | — |
| Diethylene glycol monobutyl ether | 12.0 | 12.0 | 12.0 | 12.0 | — | — |
| Propylene glycol | 10.0 | 10.0 | 10.0 | 10.0 | — | — |
| Triethanolamine | 5.0 | 5.0 | 5.0 | 5.0 | — | — |
| Sodium carboxymethyl cellulose | — | — | — | — | 0.5 | 0.5 |
| Sodium hydroxide | — | — | — | 0.02 | 0.59 | 0.59 |
| Sodium 4-(2H—naphtho-[1,2-d]triazol-2-yl)-2-stilbene-sulfonate | 0.18 | — | 0.12 | 0.18 | 1.0* | — |
| Disodium 4,4'-bis-((4-anilino-6-methylhydroxyethyl-amino-1,3,5-triazin-2-yl)-amino)-2,2'-stilbene disulfonate | — | 0.18 | 0.06 | — | — | 1.0* |
| Water | Balance to 100 | | | | | |

*Brightener not in solution.

The results were as follows.

| Fabric | Grade - 10 min/dry | | | | | |
|---|---|---|---|---|---|---|
| | A | B | C | D | E | F |
| Coarse weave cotton | 1.0 | 2.5 | 1.5 | 1.0 | 1.5 | 3.0 |
| Cotton sweater | 2.0 | 3.0 | 3.0 | T | T | 3.5 |
| Unbleached muslin | T | 2.5 | 2.0 | 1.5 | 1.0 | 2.0 |
| Underwear | T | 1.5 | 1.0 | 0 | 0 | 1.0 |
| White T-shirt | 0 | 0 | 0 | 0 | 0 | T |

Only Composition D is within the scope of the present invention, although the monosulfonated brightener also provided reduced staining in A (which did not contain an anionic surfactant) and E (which was not a stable isotropic liquid).

EXAMPLE XIII

Brightener staining was evaluated as described in Example XI in the following composition.

| Component | Wt. % |
|---|---|
| $C_{13}$ linear alkylbenzene sulfonic acid | 7.2 |
| $C_{14-15}$ alkyl polyethoxylate (1.9) sulfuric acid | 10.8 |
| $C_{12-13}$ alcohol polyethoxylate (6.5) | 6.5 |
| $C_{12-14}$ fatty acid | 15.0 |
| Citric acid (anhydrous) | 4.6 |
| Sodium diethylenetriamine pentaacetate | 0.6 |
| TEPA-$E_{15-18}$* | 1.0 |
| Monoethanolamine | 7.0 |
| Sodium hydroxide | 1.0 |
| Potassium hydroxide | 0.94 |
| Propylene glycol | 4.0 |
| Ethanol | 6.5 |
| Sodium formate | 1.0 |
| Calcium hydroxide | 0.15 |
| Brightener | As indicated |
| Minors and water | Balance to 100 |

Tetraethylene pentaimine ethoxylated with 15-18 moles (avg.) of ethylene oxide at each hydrogen site.

Brightener

A=0.12% disodium 4,4'-bis((4-anilino-6-methylhydroxyethylamino-1,3,5-triazin-2-yl)amino)-2,2'-stilbene disulfonate+0.06% disodium 2,2-(4,4'-biphenylene divinylene)-dibenzenesulfonate B=0.18% sodium 4-(2H-naphtho[1,2-d]triazol-2-yl)-2-stilbenzenesulfonate C=0.15% sodium 4-(2H-naphtho[1,2-d]triazol-2-yl)-2-stilbenesulfonate+0.02% disodium 4,4'-bis((4-anilino-6-methylhydroxyethylamino-1,3,5-triazin-2-yl)amino)-2,2'-stilbene disulfonate D=0.15% sodium 4-(2H-naphtho[1,2-d]triazol-2-yl)-2-stilbenesulfonate+0.02% disodium 2,2-(4,4'-biphenylene divinylene)-dibenzenesulfonate E=0.12% sodium 4-(2H-naphtho[1,2-d]triazol-2-yl)-2-stilbenesulfonate+0.06% disodium 2,2-(4,4'-biphenylene divinylene)-dibenzenesulfonate The results were as follows.

| Fabric | Composition | Grade 10 min/dry | Grade overnight/damp |
|---|---|---|---|
| Coarse weave cotton | A | 2.8 | 4.0 |
| Coarse weave cotton | B | T | 2.5 |
| Coarse weave cotton | C | 2.0 | 2.9 |
| Coarse weave cotton | D | 0.5 | 3.1 |
| Coarse weave cotton | E | 1.5 | 3.3 |
| Cotton sweater | A | 2.7 | 4.0 |
| " | B | T | 2.7 |
| " | C | 1.3 | 3.2 |
| " | D | T | 3.3 |
| " | E | 0.5 | 3.3 |
| Unbleached muslin | A | 2.0 | 3.0 |
| " | B | T | 2.0 |
| " | C | 1.0 | 2.0 |
| " | D | T | 2.0 |
| " | E | T | 1.3 |
| Underwear | A | 2.0 | 3.5 |
| " | B | 0 | 2.2 |
| " | C | T | 1.8 |
| " | D | T | 1.5 |
| " | E | T | 1.0 |
| White T-shirt | A | T | 1.5 |
| " | B | 0 | T |
| " | C | 0 | T |
| " | D | 0 | 0 |
| " | E | 0 | T |
| Unbrightened cotton knit | A | 1.5 | 3.8 |
| | B | T | 2.4 |
| | C | 0.8 | 3.0 |
| | D | T | 3.1 |
| | E | 0.3 | 3.3 |
| Unbrightened cotton knit (bleached) | A | 2.0 | 3.8 |
| | B | 0 | 1.3 |
| | C | T | 1.1 |
| | D | T | 1.4 |
| | E | 0.3 | 1.0 |

Compositions B, C, D and E of the present invention caused less staining of the cotton fabrics.

EXAMPLE XIV

Brightener staining was evaluated in the following composition.

| Component | Wt. % |
|---|---|
| $C_{12}$ linear alkylbenzene sulfonic acid | 10.2 |
| Triethanolamine coconutalkyl sulfate | 3.9 |
| $C_{13-15}$ alcohol polyethoxylate (7) | 11.7 |
| Topped whole cut coconut fatty acid | 10.7 |
| Oleic acid | 3.9 |
| Citric acid (anhydrous) | 0.9 |
| Diethylenetriamine pentamethylenephosphonic acid | 0.85 |
| Triethanolamine | 4.4 |
| Sodium hydroxide | 3.0 |
| Propylene glycol | 2.8 |
| Ethanol | 5.8 |
| Sodium formate | 1.0 |
| Brightener | As indicated |
| Minors and water | Balance to 100 |

Brightener

A=0.17% sodium 4-(2H-naphtho[1,2-d]triazol-2-yl)-2-stilbenesulfonate

B=0.17% sodium 4,4'-bis((4-anilino-6-morpholino-1,3,5-triazin-2-yl)amino)-2-stilbenesulfonate C=0.17% disodium 4,4'-bis((4-anilino-6-morpholino-1,3,5-triazin-2-yl)amino)-2,2'-stilbenedisulfonate Samples of the above compositions were applied to unbrightened, unbleached raw cotton tracer fabrics. The fabrics were then washed in 30° C. water with 120 g of composition, using the fine fabric cycle setting (low agitation, high water volume). The fabrics were dried and graded in normal daylight by a panel of expert graders. There was little to no staining visible with Brightener A, light to hardly visible staining with Brightener B, and very clearly visible staining with Brightener C.

In a whiteness test of the above compositions, Brighteners B and C provided comparable whitening, whereas Brightener A was less effective at whitening.

The above composition preferably also contains about 1.5% of tetraethylene pentaimine ethoxylated with 15-18 moles (avg.) of ethylene oxide at each hydrogen site.

EXAMPLE XV

A preferred liquid laundry detergent by virtue of the low odor properties of its grease removal solvent system, its stability in microemulsion form, and its enzymatic cleaning activity (by virtue of its pH) is as follows.

| Component | Wt. % |
|---|---|
| $C_{11.8}$ linear alkyl benzene sulfonic acid | 11.0 |
| $C_{14-15}$ alcohol polyethoxylate (7) | 12.0 |
| Topped whole cut coconut fatty acid (1) | 20.5 |
| $C_{10-11}$ isoparaffins | 4.0 |
| Diethyl phthalate | 6.0 |
| Cyclohexylamine | 2.0 |
| Monomethyl ethanolamine (2) | 4.3 |
| Potassium citrate monohydrate (63.5% in water) | 2.4 |
| Dequest 2060 S | 1.7 |
| TEPA-$E_{15-18}$ (3) | 1.5 |
| Ethanol | 3.0 |
| Potassium hydroxide (50% in water) (2) | 3.0 |
| Formic acid | 0.2 |
| $CaCl_2\ 2H_2O$ | 0.05 |
| Sodium 4,4'-bis((4-anilino-6-morpholino-1,3,5-triazin-2-yl)amino-2-stilbenesulfonate | 0.18 |
| Mexatase enzyme | 0.71 |
| Termamyl 300L enzyme | 0.10 |
| Water and minors | Balance |
| Product pH | 6.9 |

(1) Chain length mixture: $C_{10}$(5%) $C_{12}$(55%) $C_{14}$(22%) $C_{18}$(2%) oleic(10%)
(2) To adjust pH to 6.6
(3) Tetraethylene pentaimine ethoxylated with 15-18 moles (avg.) of ethylene oxide at each hydrogen site.

The above composition is used in an aqueous laundry bath at a concentration of 100 ml/10 liters and provides an in-use pH of about 7.2 (varies with water hardness).

What is claimed is:

1. A stable isotropic liquid laundry detergent composition comprising, by weight:

(a) from about 3% to about 50% of an anionic synthetic surfactant; and (b) from about 0.01% to about 1% of the monosulfonated brightener 4,4'-bis((4-anilino-6-morpholino-1,3,5-triazin-2-yl)amino)-2-stilbenesulfonic acid, or a water-soluble salt thereof, which represents at least about 60% of the total brightener in the composition; said composition containing less than about 2% of quaternary ammonium cationic surfactants having 2 chains, each containing an average of from about 16 to about 22 carbon atoms.

2. A composition according to claim 1 wherein the monosulfonated brightener represents from about 75% to about 95% of the total brightener in the composition.

3. A composition according to claim 2 wherein the monosulfonated brightener represents from about 85% to about 90% of the total brightener in the composition.

4. A composition according to claim 1 comprising from about 15% to about 25% of the anionic synthetic surfactant, which comprises a $C_{10}$–$C_{18}$ alkyl sulfate containing an average of from 0 to about 4 ethylene oxide units per mole of alkyl sulfate, a $C_{11}$–$C_{13}$ linear alkylbenzene sulfonate, or mixtures thereof.

5. A composition according to claim 4 comprising from about 0.1% to about 0.3% of the monosulfonated brightener.

6. A composition according to claim 5 further comprising from about 4% to about 15% of a nonionic surfactant which is a condensation product of a $C_{12}$–$C_{15}$ alcohol with from about 3 to about 8 moles of ethylene oxide per mole of alcohol.

7. A composition according to claim 6 further comprising from about 5% to about 20% of a $C_{10}$–$C_{22}$ fatty acid.

8. A composition according to claim 7 wherein the monosulfonated brightener represents from about 80% to about 95% of the total brightener in the composition.

9. A composition according to claim 7 wherein the monosulfonated brightener is sodium 4,4'-bis((4-anilino-6-morpholino-1,3,5-triazin-2-yl)amino)-2-stilbenesulfonate.

10. A composition according to claim 1 being substantially free of quaternary ammonium cationic surfactants having 2 chains, each containing an average of from about 16 to about 22 carbon atoms.

11. A composition according to claim 1 being substantially free of phosphate materials.

* * * * *